United States Patent [19]

Riggs et al.

[11] 3,754,777

[45] Aug. 28, 1973

[54] AUTOMATICALLY OPERATIVELY POSITIONED AND STORABLE OUTRIGGER PAD

[75] Inventors: David K. Riggs; Frank G. Smith, both of Battle Creek, Mich.

[73] Assignee: American Fire Apparatus Co., Battle Creek, Mich.

[22] Filed: Mar. 9, 1972

[21] Appl. No.: 233,209

[52] U.S. Cl.............. 280/150.5, 212/145, 254/86 H
[51] Int. Cl. .............................................. B60s 9/02
[58] Field of Search.................. 280/150.5; 212/145; 254/86 H

[56] References Cited
UNITED STATES PATENTS

| | | | |
|---|---|---|---|
| 3,007,717 | 11/1961 | Noly | 280/150.5 |
| 3,332,661 | 7/1967 | Hand | 280/150.5 |
| 3,638,965 | 2/1972 | Cassady | 280/150.5 |

*Primary Examiner*—Kenneth H. Betts
*Assistant Examiner*—Robert R. Song
*Attorney*—Woodhams et al.

[57] ABSTRACT

An outrigger pad assembly for an extendible, vehicle stabilizing outrigger. The pad assembly is automatically carried from a position of storage within the perimeter of the vehicle to a ground-engaging position of use by extension of the outrigger. The pad assembly includes a platelike pad or foot swivelly affixed to the bottom of the outrigger leg and translatable with respect thereto tranversely of the truck between a storage position eccentric of the outrigger leg and a use position substantially central of the outrigger leg. The pad area is a large multiple of the cross-sectional area of the outrigger leg and both the outrigger leg and pad store within and substantially flush with the sides of the vehicle.

9 Claims, 13 Drawing Figures

Patented Aug. 28, 1973

Patented Aug. 28, 1973
3,754,777
3 Sheets-Sheet 2
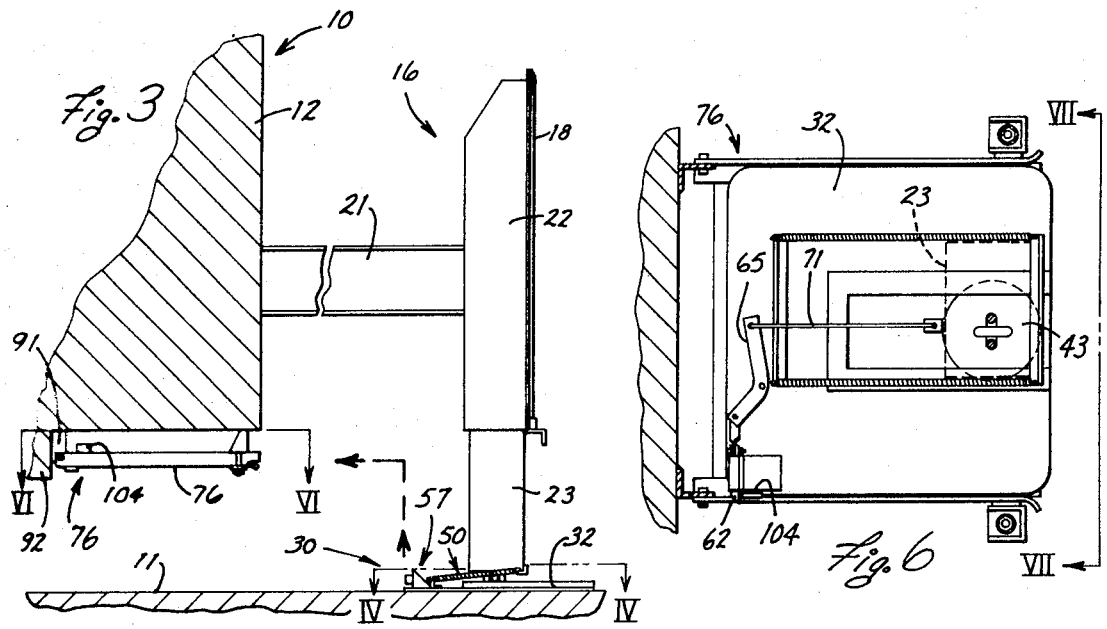
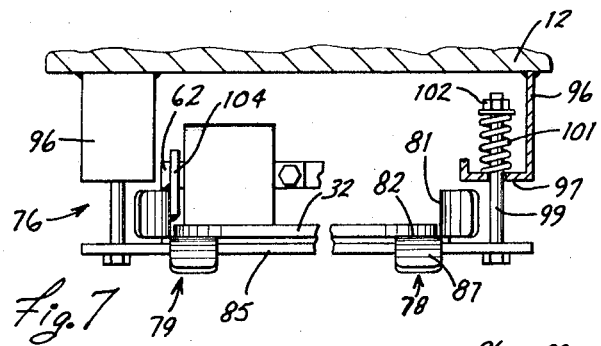
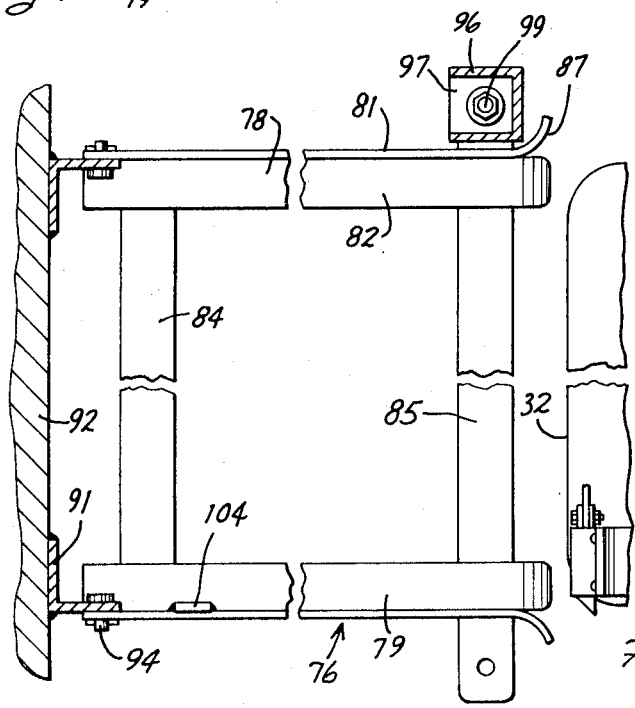

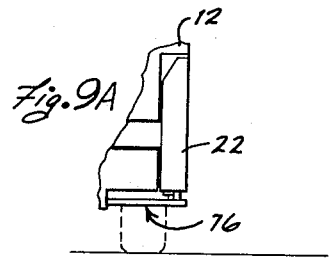
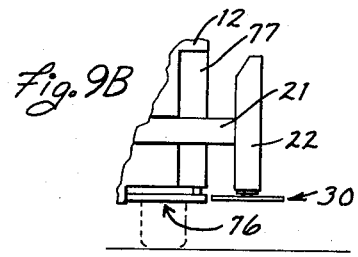
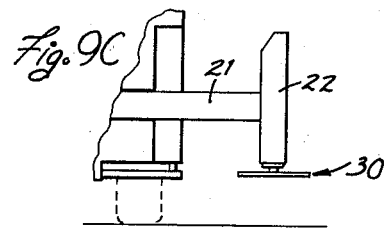
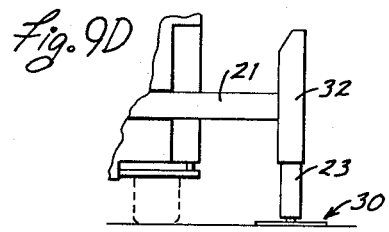
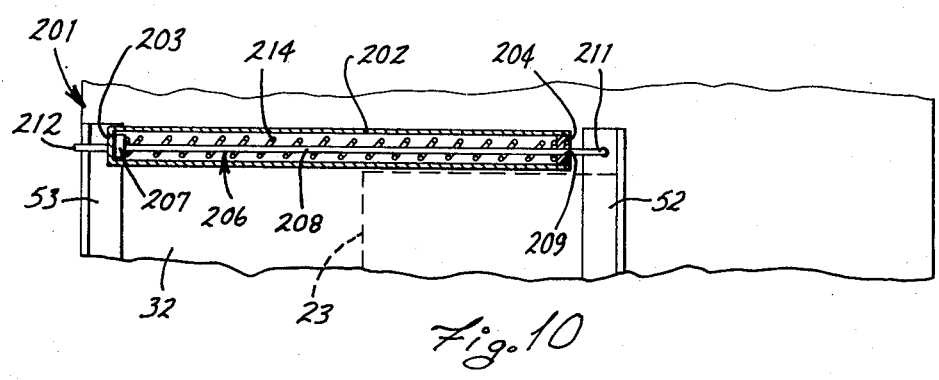

AUTOMATICALLY OPERATIVELY POSITIONED AND STORABLE OUTRIGGER PAD

FIELD OF THE INVENTION

This invention relates to a pad assembly for a truck steadying outrigger and more particularly relates to a pad assembly storable when attached to the outrigger leg and capable of automatically assuming the ground-engaging position of use as the outrigger is extended from the truck to its position of use.

BACKGROUND OF THE INVENTION

It is well known to provide extensible outriggers on vehicles for preventing tipping of the vehicle when the vehicle is in a stationary position. Such extensible outriggers are frequently provided on trucks having upwardly extensible apparatus, such as power company aerial platforms and fire fighting equipment including aerial ladders, aerial platforms and aerial water towers. One or more, usually a pair, of such outriggers are provided on each side of the vehicle, normally at longitudinally spaced locations. When in use the outriggers extend substantially beyond the side of the truck and contact the ground adjacent the truck by means of a plate-like pad or foot whereby to effectively widen the area in which the truck is supported on the ground and thereby to stabilize same to prevent tipping of the truck by transverse loading of, for example, a vertically extended aerial tower.

It has been common in the past to use a relatively small area outrigger pad or foot, that is, a pad of area not materially larger than the cross-sectional area of the outrigger leg itself, for example, a cross-sectional area of less than a square foot, perhaps less than half a square foot. Such small area pads are normally sufficient, however, only where the tipping moment imposed upon the truck is small and wherein the supporting surface for the truck is firm, e.g. a paved surface.

However, the tipping moment may become dangerously large when, for example, the aerial apparatus is relatively tall, wind loading thereon is moderate to high due to substantial wind speeds and/or large elevated surface area, location of the upper end of the aerial apparatus is not substantially centered above the truck body or is transversely overhanging same or a substantial weight is carried by the upper end of the aerial apparatus. Under any of these, or other, unfavorable circumstances, such as a soft pad supporting surface, such small area pads may allow tipping of the truck and consequent damage to the equipment or nearby persons and property, due to the high compressive loadings between the pad and supporting ground occasioned by the small pad area.

Use of such small area pads has, however, simplified retractable outrigger design in that no special measures are required for storage of such small area pads since same are essentially a continuation of the cross-sectional area of the outrigger leg itself, the pads being essentially self-storing upon retraction of the outrigger leg into the body of the vehicle.

Substantially increasing the area of such pads, for example, to areas in the neighborhood of four square feet, materially improves the stability and tipping resistance of the vehicle under adverse conditions, namely, high tipping moments and/or soft ground. However, use of such large area pads has been resisted in the past despite the above advantages thereof because of difficulties encountered in storage of such large pads.

One approach has been to remove the pad from the outrigger leg after each use and preparatory to full retraction of the outrigger into its stored position on the truck, followed by independent storage of the removed pads in a separate location on the truck. This is particularly disadvantageous in the case of emergency vehicles where rapid set-up with a minimum of operator effort is required, since set-up has required manual removal of the pads from the storage place, partial extension of the outriggers, manual mounting of the pads on the outriggers and, finally, completion of the extension of the outriggers. This routine may take several men 15 to 30 minutes to complete. Such delay is obviously undesirable in the case of fire fighting apparatus which must be put into action as quickly as possible upon arrival at the scene of a fire to minimize loss of property and life.

On the other hand, attempts to permanently attach such large area pads to outriggers in the past have been generally unsuccessful. Conventional outriggers particularly those of the type including a vertical leg normally store in their retracted position flush or substantially flush with the sidewall of the truck so as to minimize the space within the truck consumed by storage of the outrigger and thereby leaving a greater amount of useful space for other equipment. Thus, retention of the pad on the outrigger during retraction has generally meant location of the outrigger more deeply within the body of the truck thus wasting additional space or has meant an unacceptable extension of a portion of the pad outboard of the side of the truck which may violate laws limiting maximum vehicle width.

Thus, the objects of this invention include provision of:

1. A pad construction for an extensible vehicle outrigger which automatically extends to a position of use upon extension of the outrigger from its stored position on the vehicle.

2. A pad construction, as aforesaid, incorporating a ground-engaging pad of substantial area and, which area substantially exceeds a cross-sectional area of the outrigger leg to which it is attached.

3. A pad construction, as aforesaid, capable of firmly supporting the vehicle against tipping even when the vehicle is located on relatively soft ground and/or subjected to relatively great tipping movements as the result of, for example, extension of aerial apparatus located on the truck to a relatively great height, carrying of relatively heavy static loads at or near the top of such aerial apparatus, location of the top of the aerial apparatus transversely beyond the sides of the truck, high wind loading on the aerial apparatus transversely of the truck and/or substantial transverse loading on the aerial apparatus at or near the top thereof resulting from high velocity, high volume water jets directed transversely of the vehicle.

4. A pad construction, as aforesaid, extendible with its associated outrigger from a stored position within the truck body perimeter to a ground-engaging position of use rapidly and without manual handling thereof, eliminating risk of injury to personnel in manual installation of heavy outrigger pads, and wherein a plurality of such outriggers with associated pads may be extended to a position of use by a single operator utilizing centralized controls remote from each of the outriggers.

5. A pad construction, as aforesaid, which is readily returnable to a stored position within the truck upon return to storage of the associated outrigger and without detachment from the outrigger. 6. An outrigger construction, as aforesaid, which is swivelly mounted to its corresponding outrigger leg and adapted to assume an angled relation with respect thereto upon contact with uneven or sloped ground to maintain the truck level, the pad being resiliently biased to a substantially horizontal orientation.

7. A pad construction, as aforesaid, which is translatable with respect to its corresponding outrigger leg to a position eccentric of the outrigger leg wherein the pad and associated outrigger leg may be stored within the sidewall of the truck and substantially flush therewith, wherein storage space required within the truck body for the outrigger is minimized and wherein virtually no useful space within the truck body need be occupied by the pad during storage.

8. An outrigger pad, as aforesaid, wherein the pad, upon extension of the outrigger automatically translates with respect to the outrigger leg from its eccentric storage position with respect thereto to a substantially centered use position with respect thereto. 9. A pad construction, as aforesaid, in which the pad is fixedly maintained within a storage position upon being placed therein but will automatically disengage from said fixed position upon extension of the associated outrigger.

10. A pad construction, as aforesaid, which is of simplified construction, adapted to manufacture in large or small quantities at relatively low cost, which does not materially add to the cost of the outrigger as compared with conventional pad constructions, which is capable of rugged construction for long and trouble-free use over extended periods under adverse conditions of use and which moreover is readily removed or replaced without the necessity of disassembly of the outrigger associated therewith.

Other objects and purposes of this invention will be apparent to persons acquainted with apparatus of this general type upon reading the following specification and inspecting the accompanying drawings.

BRIEF DESCRIPTION OF THE DRAWINGS

FIG. 3 is a fragmentary, partially broken view of the apparatus of FIG. 1 taken from the rear of the vehicle and showing an outrigger and pad incorporating the present invention in a position of use.

FIG. 6 is an enlarged, sectional view substantially taken on the line VI—VI of FIG. 3 but showing the pad in a stored position with respect to the vehicle.

FIG. 7 is an enlarged, fragmentary and partially broken view substantially taken on the line VII—VII of FIG. 6.

FIG. 8 is an enlarged, fragmentary, partially broken view similar to FIG. 6 but with the pad removed from storage.

FIGS. 9A through 9D disclose schematically several positions occupied by the outrigger and pad between their use and stored positions and generally correspond in orientation to FIG. 3.

FIG. 10 discloses a modified centering spring unit.

SUMMARY OF THE INVENTION

The objects and purposes of the invention are met by providing an outrigger pad assembly for an extendible, vehicle stabilizing outrigger. The pad assembly is automatically carried from a position of storage within the perimeter of the vehicle to a ground-engaging position of use by extension of the outrigger. The pad assembly includes a platelike pad or foot swivelly affixed to the bottom of the outrigger leg and translatable with respect thereto transversely of the truck between a storage position eccentric of the outrigger leg in the use position substantially central of the outrigger leg. The pad area is a large multiple of the cross-sectional area of the outrigger leg and both the outrigger leg and pad store substantially flush with the sides of the vehicle.

DETAILED DESCRIPTION

Figure 1:
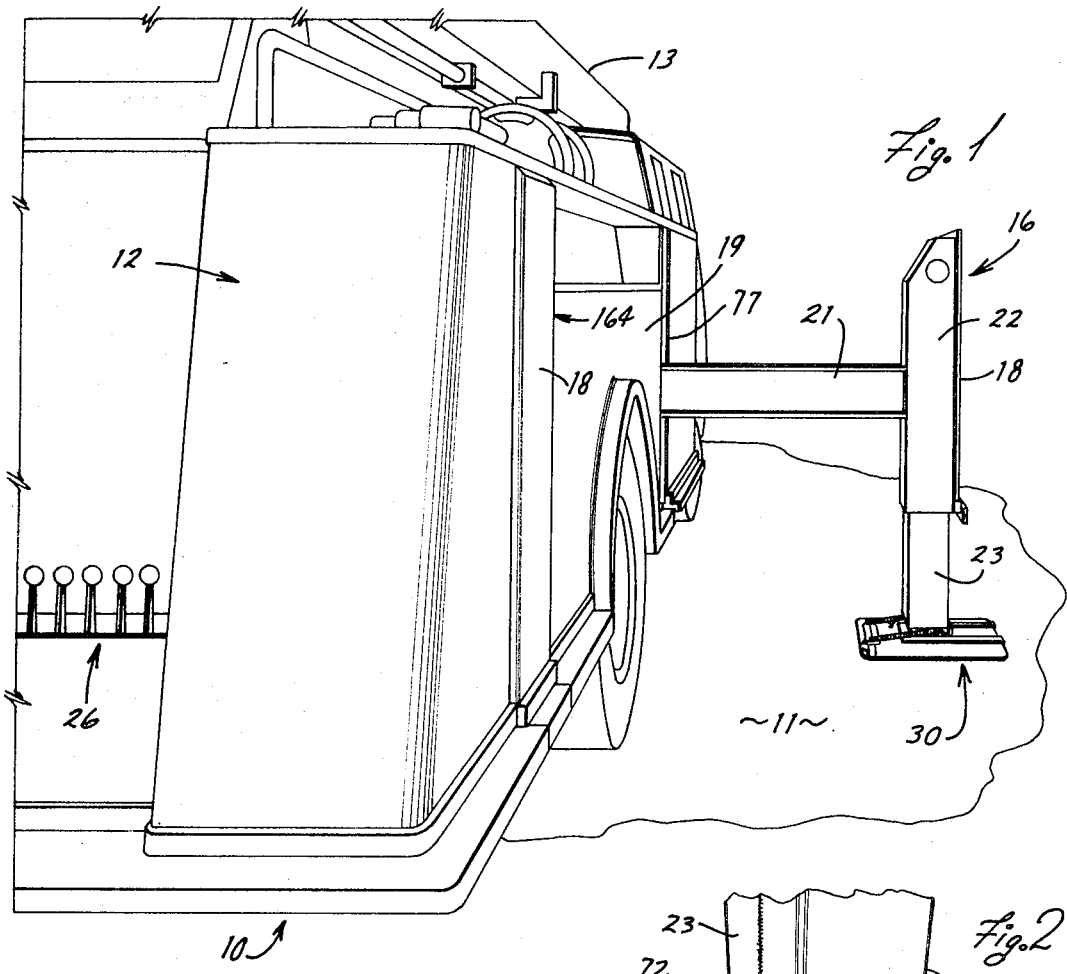
FIG. 1 is a fragmentary, pictorial view of a vehicle equipped with outriggers embodying the present invention and disclosing one of a pair of such outriggers on one side of such vehicle in its extended position of use and the other in its stored position.
Figure 2:
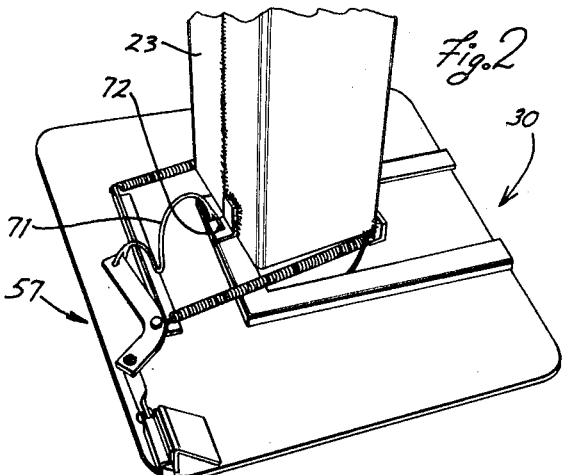
FIG. 2 is a enlarged, fragmentary, pictorial view of an outrigger pad embodying in the invention in a position of use and disclosing a portion of the outrigger leg attached thereto.

FIG. 1 discloses a vehicle, more particularly a truck, 10 located on a supporting surface such as the ground 11 and having a body 12. Although the present invention may be used in connection with vehicles of any desired type, the present invention was developed to meet a need in aerial apparatus trucks, such as power line maintenance trucks and, more particularly, fire fighting trucks of the type supporting a raisable, rotatable and extendible member 13 in the form for example of an aerial ladder, or a nozzle and/or platform supporting boom.

Any desired number of outrigger and pad assemblies, two being here shown at 16 and 16A, are provided in longitudinally spaced relation on each side of the truck 10. The outrigger and pad assemblies 16 and 16A are preferably substantially identical and further description of one thereof, for example the assembly 16, will apply to all. When stored, such outriggers are located as indicated at 16A in a position within the confines of the truck body with the exterior face 18 of such assembly being substantially flush with the sidewall 19 of the truck body, to avoid violation of applicable vehicle width regulations and to avoid interfering with movement of the truck from place to place. When in its position of use each such outrigger and pad assembly, as shown at 16, extends outwardly transversely from the sidewall 19 of the truck body to engage the ground at a point which may be spaced several feet from the truck to steady and prevent tipping of the truck, for example during use of the aerial apparatus 13.

In the particular embodiment shown, each outrigger, for example the outrigger 16, comprises a substantially horizontal arm 21 telescopable into and out of the body of the truck by any conventional means not shown and rigidly connected at its exterior end to an upstanding leg receiver 22. A leg 23 is telescoped for substantially vertical movement upwardly thereinto and downwardly out of the receiver 22. In the particular embodiment shown, a face plate is provided on the exterior face of the leg receiver 22 for furnishing the above-mentioned exterior face 18. Suitable motor means, preferably hydraulic cylinders, are provided within the truck body 12 and leg receiver 22 for longitudinally moving the arm 21 and leg 23 with respect thereto to accomplish extension and storage of the outrigger 16. Such motor means may be actuated in any convenient way, for example through hydraulic lines not shown energizable from a centralized location via a set of controls 26, whereby all outriggers of the truck may be simultaneously and rapidly extended from storage to use positions by a single operator.

The outriggers to the extent above-described with reference to FIG. 1 are of a conventional type. Although the pad construction hereinafter described may be used with outriggers of other types, for example, outriggers having angled legs either telescopingly or pivotally mounted with respect to the truck, the outrigger 16 to the extent above-described is of a particularly desirable type in that it requires relatively little storage volume within the truck leaving substantial space for other purposes and further is constructable to withstand relatively heavy tipping moments.

Turning now to the area more directly related to the present invention, the outrigger and pad assembly 16 carries at the lower end of leg 23 a pad or foot unit 30 disclosed in detail in FIGS. 2–9. Pad unit 30 (FIGS. 4 and 5) comprises a large area, platelike pad, preferably of substantially square shape having rounded corners 31.

An undercut slideway 33 extends from the outboard (rightward) edge of the plate 32 leftwardly or inwardly past the center of the plate 32 and is substantially centered between the forward and rearward edges of the plate. The slideway 33 is closed at its leftward (inner) end. In the particular embodiment shown, the slideway 33 is formed by a pair of longitudinal angle members 35 and 36 extending leftwardly from the edge of the plate 32 and an end angle member 37 connecting the leftward ends of the angle members 35 and 36 to close the inner edge of the slideway. Each of the angle members 35 through 37 comprises an upstanding element 38 fixed atop the plate 32 preferably by welding and a preferably integral, horizontal element 41 extending inboard from the upstanding element 38. The end member 37 preferably is joined by welding to the adjacent ends of longitudinal members 35 and 36.

A slider 43, here a disk, preferably circular, is snugly but slidably received within the slideway 33 beneath the horizontal elements or flanges 41 of the longitudinal angles 35 and 36 and, when centered on the plate 32, beneath the corresponding horizontal element of the end angle member 37. The disk 43 is connected to the lower end of the outrigger leg 23 by a swivel joint 46 which in the particular embodiment shown comprises upper and lower, interlinked and substantially C-shaped elements 47 and 48. The lower element 48 is preferably joined as by welding to the central portion of the disk 43. The upper element 47 is fixed at its ends to the leg, preferably removably as by welding to a suitable adapter plate 49 in turn secured as by screws not shown to the bottom of the leg 23. Such swivel connection 46 allows the plate 32 to rock in two vertical, mutually othogonal planes to accommodate sloping ground. In use, the abutment between element 48 and leg 23, or element 47 and disk 43, provides support against tipping for the truck.

A centering device 50 is provided for resiliently urging the plate 32 into a substantially centered position beneath the leg 23 and comprises an angle bracket 52 which is fixed to the outboard face of the leg 23 adjacent the bottom end thereof and extends transversely beyond the leg. A further angle bracket 53 is fixed to the plate 32 intermediate the leftward plate edge and the slideway 33 and normally parallels the angle bracket 52. Coil tension springs 54 and 55 extend from the ends of the bracket 53 to corresponding ends of the bracket 52 and apply sufficient force from the leg 23 to the plate 32 as to cause the plate 32 to slide from its eccentric position beneath the leg 23 shown in FIG. 6 to its centered, use position of FIG. 4. Spring tension is preferably such as to tend to maintain the plate 32 substantially level when suspended from the leg 23 above the ground 11.

Figure 4:
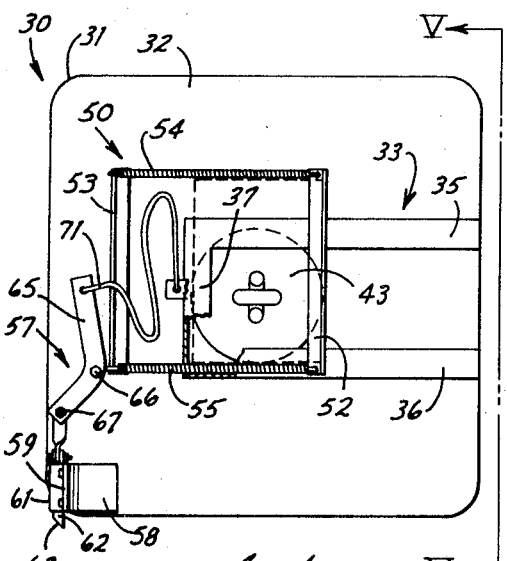
FIG. 4 is an enlarged, partially broken, sectional view substantially taken on the line IV—IV of FIG. 3.
Figure 5:
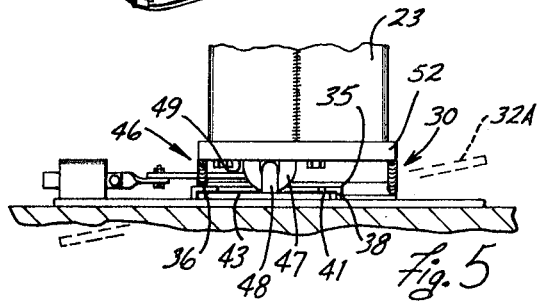
FIG. 5 is a sectional view substantially taken on the line V—V of FIG. 4.

An automatically releasing latch mechanism 57 (FIGS. 2 and 4) is provided on the pad unit 30 for purposes appearing hereinafter. More particularly, the latch mechanism 57 comprises an upwardly extending support 58 fixed as by welding to the plate 32 adjacent the lower leftward corner thereof as seen in FIG. 4 and preferably having a substantially vertical surface 59 facing the truck to which is secured a latch 61. The latch 61 includes an elongate, longitudinally slidable latch element 62 mounted for movement substantially in the length direction of the truck and having a beveled surface 63 facing the truck. The latch element 62 is resiliently and longitudinally urged to extend outboard of the plate 32 by any convenient spring means not shown, preferably located within the latch 61.

A bell crank 65 is pivotally mounted intermediate its ends at 66 on the plate 32 and extends substantially along the leftward edge of the plate 32 away from the latch 61. One end of the bell crank 65 is pivotally fixed at 67 to the inboard end of the latch element 62. The other, or inboard, end of the bell crank 65 is fixed to a flexible cable 71, the other end of which is secured to a bracket 72 fixed to the inboard face of the leg 23 near the bottom end thereof. The length of the cable 72 is such that same will be fully tensioned, and will through rotation of the bell crank 65 cause retraction of the latch element 62, when the leg 23 and disk 43 move rightwardly with respect to the plate 32 beyond the eccentric position thereof shown in FIG. 6 whereat the leftward sides of the plate 32 and leg 23 are substantially and vertically aligned.

A storage carrier 76 (FIGS. 3, 7 and 8) is located beneath the storage compartment 77 (FIG. 1) of the outrigger 16. In the particular embodiment shown the storage carrier 76 is located immediately beneath the truck body 12. The storage carrier 76 receives the pad unit 30 for storage. The storage carrier 76 comprises a generally rectangular framework having a pair of parallel, spaced and opposed angle members 78 and 79 (FIG. 8) which extend transversely of the truck body. The angle members 78 and 79 are substantially of L-shaped cross section having upstanding parallel sidewalls 81 and preferably coplanar and substantially horizontal base walls 82 extending inwardly from the sidewalls 81. The angle members 78 and 79 are preferably rigidly interconnected adjacent their ends by underlying cross members 84 and 85 fixed as by welding thereto. The outboard ends of the angle members 78 and 79 are flared as generally indicated at 87, by bending the outboard ends of the base walls 82 downwardly and of the sidewalls 81 away from each other, to facilitate guidance of the plate 32 of the pad unit onto the storage carrier 76.

Suitable brackets 91 are fixed as by welding to a suitable portion 92 of the truck, which may be part of the body 12 or supporting framework therefor. The brackets 91 include parts overlapping the inboard ends of the upstanding sidewalls 81 of angle members 78 and 79 and pivotally supporting same as by interconnecting pins or bolts 94 to allow pivotal movement of the outboard end of the storage carrier in a vertical plane.

Further brackets 96 (FIGS. 7 and 8) are fixed to the vehicle body or frame as by welding and depend therefrom above the ends of the outboard cross member 85. Each such bracket 96 includes a shelf 97 disposed intermediate the supporting portion of the truck body 12 and cross member 85. A bolt 99 passes upwardly through aligned openings in each end of the cross member 85 and the corresponding shelf 97 of the brackets 96. Each volt 99 terminates above its shelf 97 in a substantially coaxial surrounding compression spring 101 held in place thereon by a nut 102. Thus, the outboard end of the storage carrier 76 is resiliently supported for limited pivotal movement with respect to the truck to enable same to be pressed downwardly as the plate 32 is moved into position thereon. The weight of the shelf 97 and the strength of the springs 101 is such as to hold the storage carrier 76 substantially horizontal when the pad unit 30 is stored thereon.

A catch element 104 extends upwardly from the upstanding sidewall of the angle member 79 and is fixed thereto by any convenient means such as welding. The catch element 104 is positioned along the angle member 79 so that the latch element 62 will be located closely inboard thereof and in overlapping relation therewith when the pad unit 30 is in its stored position shown in FIGS. 6 and 7 whereby to hold the plate 32, against the force of the springs 54 and 55, in its eccentric stored position with respect to the leg 23.

OPERATION

Although the operation of the mechanism described above will be understood from the foregoing description by skilled persons, a summary of the operation is now given for convenience.

The outriggers are normally stored within the body of the truck 10 when not in use. When so stored, the outboard face 18 of the outrigger is substantially flush with the side of the truck as indicated at 16A in FIG. 1. Similarly, the pads 32 associated with the various outriggers are stored on their storage carriers 76 beneath the body of the truck as indicated in FIGS. 6 and 7 when the outriggers are so stored. Such corresponds to the condition shown in FIG. 9A.

When the truck 10 arrives at a location where the outriggers are to be used, for example, to steady the truck against tipping when the aerial apparatus 13 is to be used, the controls 26 are actuated to individually actuate the outriggers, or preferably to actuate all such outriggers at once, to extend same from their storage position. Thus, upon actuation of the controls 26, the outrigger 16 moves rightwardly out of its storage compartment 77 toward its position of FIG. 9B. As the outrigger receiver 22 moves rightwardly a small increment, and while at least the major portion of the disk 43 still lies in the slideway 33, the cable 71 (FIG. 6) is tensioned thereby and pulls upon the bell crank 65, rotating same in a clockwise direction and causing same to retract the latch element 62 so that the latter disengages the catch 104. Such frees the plate 32 for rightward movement along the angle members 78 and 79 of the storage carrier 76. The tensioned springs 54 and 55 (FIGS. 4 and 6) then pull the plate 32 rightwardly with respect to the leg 23. As a result, the plate 32 becomes centered beneath the leg 23 as seen in FIG. 4. Continued outboard movement of the leg 23 slides the plate 32 of the storage carrier 76 as seen in FIG. 8. The apparatus thus assumes the position shown in FIG. 9B.

Horizontal outward movement of the outrigger 16 ceases at the position shown in FIG. 9C. At this point the leg 23 moves downwardly from the receiver 22 until the plate 32 bears forcibly against the ground 11 and supports leg 23 via one or both of the elements 47 and 48. Normally, when this condition is achieved suitable conventional locking means (not shown) associated with the outrigger lock same in position to prevent unintended retraction of the leg 23 into the receiver 22. Although the present outrigger arrangement may be used to prevent tipping of the truck while the wheels thereof still remain on the ground, the legs 23 of the various outriggers may be extended to raise the truck wheels off the ground as desired either to level the truck on sloped ground or to elevate the entire truck.

The springs 54 and 55 tend to maintain the plate 32 substantially level after it leaves the storage carrier 76. However, when the truck is located on uneven or sloped ground, the plate 32 upon contacting the ground will assume the slope (e.g. or at 32A in FIG. 5) thereof as the leg 23 continues to extend.

The aerial apparatus 13 may then be raised to a position of use.

It will be noted that, as the outrigger moves out of its storage compartment 77 and full extension of arm 21 and the leg 23 is achieved, the pad unit 30 will, automatically and without specific attention by operating personnel, have been removed from its stored location to its ground-engaging location of use. Further, shifting of the pad unit 30 from its stored position to its position of use shown in FIG. 3, is rapid, taking place during the normal period of extension of the outrigger arm 21 and leg 23 and adding no further time increment thereto.

When it is desired to remove the truck from its position of use, the aerial apparatus 13 is brought into its lower or transport position shown in FIG. 1 and thereafter, the outriggers 16 are normally retracted. Such retraction is normally accomplished by a reverse actuation of the controls 26 which are sequenced manually or automatically to cause, for each outrigger, the leg 23 to retract upwardly into the receiver 22 raising the plate 32 from the ground. Thereafter, the arm 21 retracts horizontally into the truck body, the plate 32, held substantially level by the springs 50, being at or slightly above the level of the horizontal base walls of the storage carrier angles 78 and 79.

In the particular embodiment shown, the plate 32 during retraction of the outrigger arm 21, tends to align itself for proper entry onto the carrier 76. However, an operator will normally be located near the retracting outrigger 16, for purposes appearing hereinafter, and may desirably elect to manually guide the plate 32 past the flared outboard portions 87 of the storage carrier and onto the base walls 82 thereof, as the arm 21 retracts, to achieve the transition from the position of FIG. 9B to the position of FIG. 9A. With the outrigger arm 21 fully retracted and the exterior face 18 of receiver 22 substantially flush with the body of the truck in its stored position, the plate 32 will still be centered beneath the leg 23 and thus the rightward portion thereof will overhang and extend beyond the side of the truck.

At this point, the operator standing nearby manually engages the rightward edge of the plate and pushes same inboard of the truck causing the plate 32 and latch element 62 to move inwardly along the storage carrier 76. During such movement, the beveled surface 63 of the latch element 62 contacts the catch 104 and is displaced inboard of the plate 32 thereby, the tip of the latch element 62 moving along the inwardly facing surface of the catch 104 until the latch element 62 has passed the catch 104. At such time the internal spring bias of the latch 61 causes the latch element 62 to again extend, as shown in FIG. 6, so that unintended outward movement of the plate 32 is prevented by interference between the latch element 62 and catch 104. At such point, the plate 32 has moved inboard of the truck with respect to the leg 23 and is now eccentrically positioned with respect to the leg 23 as shown in FIG. 6. The rightward edge of the plate 32 is, in such position, substantially flush with the side of the truck and thus no longer extends therebeyond. In this manner, the pad unit 30 is returned to its fully stored position. When the above retraction procedure has been carried out for all outriggers, the truck may be driven away from its location of use.

Although the particular embodiment shown is arranged for utilizing manual assistance in shifting of the plate 32 from its centered position on the leg 23 shown in FIG. 4 to its eccentric stored position shown in FIG. 6, it is contemplated that suitable power means may be added to cooperate with the pad unit 30 to automatically achieve its fully stored, latched position.

MODIFICATION

FIG. 10 discloses a modified centering spring unit 201 for use in pairs in place of springs 54 and 55 of FIG. 4. The unit 201 comprises a hollow cylindrical casing 202 with end walls 203 and 204. A plunger 206 has a head 207 slidable within the casing 202 and a rod 208 which extends from the head slidably through a central opening 209 in end wall 204 and terminates in a suitable fastening device, here a hook 211, probably engageable with an extension of the angle bracket 52 on leg 23. A further fastening device, here a hook 212 pivotally engages the leftward end wall 203 of the casing to an extension of angle bracket 53 on plate 32. A coiled compression spring 214 lies radially between the rod 208 and casing periphery and extends axially between head 207 and wall 209.

A pair of such units on opposite sides of the leg 23 resiliently urge the plate 32 into its substantially centered, use position beneath the leg 23, as in the case of springs 54 and 55 of FIG. 4. However, use of a pair of units 201 provides an additional advantageous result. More particularly, should the latch mechanism 57 (FIG. 4) fail to release upon extension of the outrigger, e.g., due to a broken cable 71, bottoming of the head 207 and fully compressed spring 214 against rightward end wall 204 of each unit 201 will positively prevent further extension of the outrigger and hence separation of leg 23 from the plate 32. Damage to the spring units 201 and other outrigger and pad assembly components is avoided by conventional use of an overload, or excess pressure relief, valve in the fluid circuitry of the outrigger. In the event of such a failure to release, the outrigger can be returned to its stored position for later repair. On the other hand, the outrigger can be used immediately, if necessary, simply by manually releasing the latch 57.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. Extensible outrigger apparatus for prevention of tipping of a vehicle, comprising in combination:
    an outrigger leg extensible from a position of storage on the vehicle to a position of use spaced laterally outwardly and downwardly from said position of storage;
    a ground-engageable pad;
    coupling means for securing said pad to the lower end of said leg for allowing lateral translation of said pad with respect to said leg from an eccentric storage position to a substantially centered use position;
    means for shifting said pad from said eccentric storage position to said substantially centered use position with respect to said leg automatically upon extension of said outrigger from its storage position.

2. The device of claim 1, in which said pad comprises a substantially platelike member and said coupling means includes first and second relatively slidable members associated respectively with said leg and said pad.

3. The device of claim 2, wherein said first relatively slidable member comprises a disk connected to said leg and said second relatively slidable member comprises means defining an undercut groove on the upper surface of the pad extending from one edge thereof to a position past the center thereof for receiving said disk therein for relative slidable movement therealong, said coupling means further including a swivel connection between said disk and the end portion of said leg.

4. The device of claim 1, in which said coupling means comprises a slideway on said pad and a slider connected to said leg and slidable along said slideway, said means for shifting including a resilient tension element connected between said leg and a portion of said pad displaced from an end of said slideway for urging said pad to a substantially centered position beneath said leg.

5. The device of claim 1, including a storage carrier supported on the vehicle below the normal position of storage of said outrigger leg and adapted to receive said pad thereon for storage, interengageable latch means fixed with respect to said pad and storage carrier for maintaining said pad in an eccentric location with respect to said leg during storage and latch releasing means automatically responsive to extension of said outrigger for disengaging said latch means to allow said pad to be removed from storage carrier upon extension of said outrigger.

6. The device of claim 5, in which said latch releasing means comprises a mechanism interconnecting said latch means with said outrigger leg and including a tension element responsive to displacement of said leg in a direction substantially outboard of said pad for releasing said latch means.

7. The device of claim 1, in which said outrigger leg is shiftable from a location of storage on the vehicle to a location of use spaced outboard of said vehicle, said pad comprising a large area plate adapted for ground engagement on the underside thereof;

said coupling means comprising a spaced parallel pair of angle members fixed to the upper side of said plate and having opposed flanges extending toward each other and spaced substantially parallel relation with said plate, said angle members extending from the edge of said plate furthest from the center of said vehicle inboard of said plate past the center thereof and being interconnected at their inboard ends by a further similar angle member for defining a slideway having a closed inboard end, a disk receivable slidably in said slideway and overlapped by said flanges for retention in such slideway, swivel means allowing tipping of said plate at least in two mutually othogonal vertical planes interconnecting said disk and the bottom portion of said leg for allowing said plate to be carried by said leg in spaced relationship to the ground while allowing swivelling and sliding of said plate with respect to said leg;

said means for shifting including spaced parallel brackets on said leg and said plate extending substantially transversely to the length dimension of said slideway and located on opposite sides of said leg, said bracket on said plate being displaced beyond the closed end of said slideway, a pair of tension springs interconnecting the opposed ends of said leg and plate brackets for urging said plate to a substantially centered position beneath said leg whereat said disk is located substantially at the closed end of said slideway; and including a carrier on said vehicle below the normal stored position for said leg and comprising a spaced parallel pair of members upon which said plate is slidable, said spaced parallel members extending transversely of said vehicle in substantial alignment with the direction of extension of said outrigger, a catch on said carrier, a movable latch element and means supporting same on said plate for transverse movement with respect thereto in a direction substantially at right angles to said carrier members, said latch element being adapted to lie inboard of said catch when said plate is located on said carrier members with the outboard edge of said plate substantially flush with said side of said vehicle whereby said latch element and catch interact to prevent unintended outward movement of said plate off said carrier, a tension cable and a bell crank, said bell crank being pivotally supported on said plate and engaged at one end thereof with said latch element, said tension cable connecting the other end of said bell crank to said leg for retraction of said latch element out of obstructing relation with said catch upon tensioning of said tension cable, said bell crank being displaced inboard of said closed end of said slideway whereby movement of said leg away from said vehicle past a preselected position of maximum eccentricity with respect to said plate tensions said cable and releases said latch element from said catch to allow said springs to move said plate outboard along said carrier to a substantially centered position beneath said leg as said outrigger extends.

8. The device of claim 7, in which said disk is substantially circular and said swivel means comprises an opposed, interlinked pair of substantially C-shaped lugs fixed respectively to said disk and to said leg.

9. The device of claim 7, in which said carrier members are pivoted adjacent their inboard ends for rotation in substantially vertical planes and including means resiliently connecting the outboard ends of said members to said vehicle for resiliently resisting downward movement of said outboard ends, the outboard ends of said members being flared to assist entry of said plate thereon.

* * * * *